R. A. GOODENOUGH.
HORSESHOE.
No. 28,469. Patented May 29, 1860.
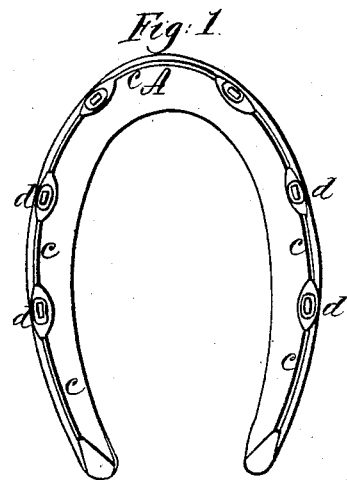
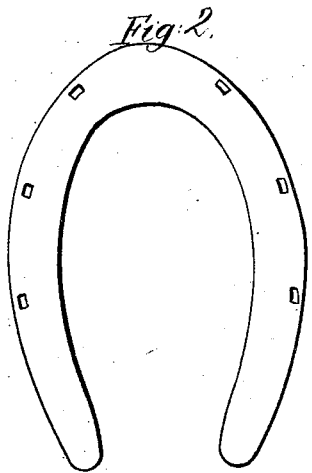
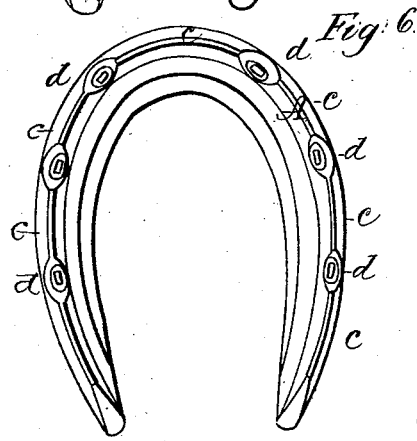
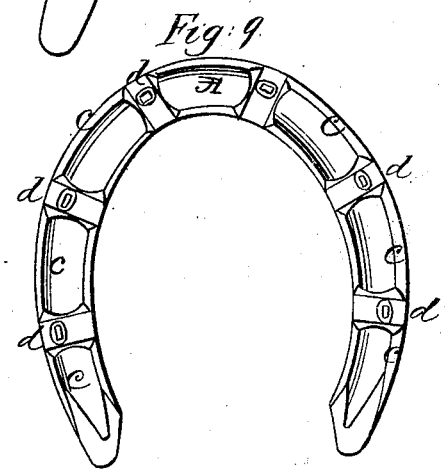
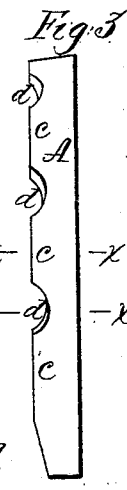
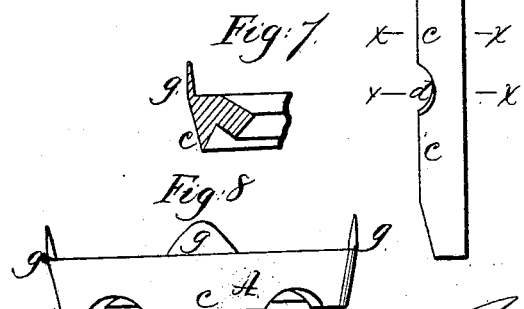
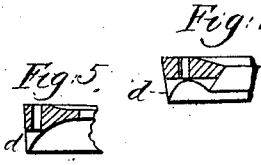
Inventor:
R. A. Goodenough
Witnesses:
W. D. Bennem
Jas. F. Wightman

UNITED STATES PATENT OFFICE.

R. A. GOODENOUGH, OF BROOKLYN, NEW YORK.

IMPROVEMENT IN HORSESHOES.

Specification forming part of Letters Patent No. 28,469, dated May 29, 1860.

*To all whom it may concern:*

Be it known that I, ROLLIN AUSTIN GOODENOUGH, of the city of Brooklyn, county of Kings, and State of New York, have invented a new and useful Improvement in Shoes for Horses and other Hoofed Animals; and I do hereby declare that the following is a full, clear, and exact description of the same, reference being had to the accompanying drawings, in which—

Figure 1 represents a view of the under side of one of my improved horseshoes of the most simple form. Fig. 2 is a view of the upper side of the same. Fig. 3 is a side view of the same, and Figs. 4 and 5 represent cross-sections of the shoe at the lines $x\ x$ and $y\ y$ of Fig. 3. Figs. 6, 7, 8, 9, and 10 represent various views of two horseshoes embodying my invention in a more complicated form.

In order that a horse may throw his weight upon his shoe with ease to himself, the hoof should be sustained immediately beneath that part thereof which an examination of the hoof shows is intended to sustain the blow in stepping, or upon the outer crust; hence, in a previous invention made by me, and for which I have made application for Letters Patent, the lower side of the shoe is fitted with a prominent continuous ridge immediately beneath the crust of the hoof. That mode of constructing a shoe is admirably adapted to prevent the horse from slipping, and for enabling him to step with ease to himself; but as the nails have to be inserted through perforations on the inner side of the ridge, the application of that shoe to the animal's hoof is attended with difficulty.

The object of the present invention is to obviate this, and to this end the under side of my improved shoe, in the most simple form, has the form of an indented ridge composed of a series of short ridges separated by a series of perforated depressions which receive the nails and protect their heads.

Several shoes constructed upon this principle are represented in the accompanying drawings to exemplify the application of my invention to practice.

In the shoe represented at Figs. 1, 2, 3, 4, and 5 the indented ridge A consists of a series of short ridges, $c\ c$, alternating with the depressions $d$, and the latter are perforated to receive the nails. When this shoe is applied to the foot, the weight of the horse is sustained immediately beneath the crust of the hoof, and as the indented ridge extends round the hoof, it distributes the blow in stepping to the whole of the crust, instead of to three points only, as the ordinary triple-corked shoe does. It also prevents slipping, affords a stable support for the horse, and does not permit the foot to rock sidewise. The perforated indentations permit the nails to be applied with facility by the smith at points sufficiently near the rim of the shoe to enter properly into the crust of the hook, and at the same time each depression furnishes a socket, which receives the nail-head, so that the latter is protected from being broken off by the more protuberant portions of the adjacent ridge.

In the shoe shown at Figs. 6, 7, and 8 the indented ridge is combined with a continuous inner ridge, and in that shown at Figs. 9 and 10 it is combined with a second indented ridge on the inner rim of the shoe. These two modifications afford increased security to the horse, and show that the invention may be embodied in modified forms.

The shoe shown at Figs. 6, 7, and 8 is fitted upon its upper side with clips $g$, which take the lateral strain from the nails. This addition is frequently made by smiths to ordinary horseshoes, and it may be applied with advantage to all shoes of my construction.

The shoes thus described may be formed of wrought metal, or may be cast in molds. In the latter case they may be made with advantage of malleable iron or of hard brass. They may be formed with more or less depressions, according to the number of nails which are required to hold the shoe to the hoof, and the ridges may be made more or less sharp, as may be deemed expedient, according to the nature of the road over which the animal is to be driven.

From the above description, taken in connection with the drawings, it will be seen that the ridge upon the lower side of my shoe is indented in such manner that it is divided into a series of short ridges, and this form of shoe must not be confounded with a continuous ridge scalloped laterally, or made in a zigzag form without depressions; nor, on the other hand, must it be confounded with a shoe having a rectangular section (instead of a ridge form) with sockets at the rim, (for the insertion of nails,) which do not extend transversely across the bent rectangular bar of which the shoe is formed.

What I claim as my invention, and desire to secure by Letters Patent, is—

A shoe for horses and other hoofed animals, having upon its under side an indented ridge, as herein described, perforated for the insertion of nails at the rim of the shoe.

In testimony whereof I have hereunto subscribed my name.

R. A. GOODENOUGH.

Witnesses:
 EDWARD BISSELL,
 W. L. BENNEM.